MAGNETICALLY ENCODED DEVICE

Filed May 3, 1963 Sheet 1 of 2

WITNESSES:

Bernard R. Giegner

James F. Young

INVENTOR

David W. Zehner

BY Dean Schron

ATTORNEY

June 24, 1969 D. W. ZEHNER 3,452,358

MAGNETICALLY ENCODED DEVICE

Filed May 3, 1965 Sheet 2 of 2

United States Patent Office 3,452,358
Patented June 24, 1969

3,452,358

MAGNETICALLY ENCODED DEVICE

David W. Zehner, Baltimore, Md., assignor to Westinghouse Electric Corporation, Pittsburgh, Pa., a corporation of Pennsylvania Filed May 3, 1963, Ser. No. 277,839
Int. Cl. G01d 15/06, 15/08, 15/12
U.S. Cl. 346—74 6 Claims This invention in general relates to magnetically encoded members, and more in particular to a method of encoding a shaft position indicator.

The use of digital computers in data processing, necessitates, in many applications, a precision analog-to-digital conversion of many analog quantities, such as the converting of a shaft position into coded electrical signals which can be used directly by the digital computer. In one type of shaft position analog-to-digital converter, a disk or drum is provided with a plurality of tracks, each being divided into conducting and non-conducting segments which may represent respectively, binary ONES and binary ZEROS. In such a scheme, a plurality of wiper arms is provided with each wiper arm riding along an associated track to sense a conducting or non-conducting segment of the track. If the wipers are not perfectly aligned, extremely large errors occur as the disk or drum is rotated. In addition, there are possibilities of erroneous readings during vibration, due to poor contact of the wipers with the tracks. Smearing of the conducting and non-conducting portions of the track at a binary ONE-ZERO interface also causes some ambiguity in a reading. Another method of position encoding-decoding, which is capable of very high resolution is a method utilizing optical techniques involving a flash source and photosensitive diodes. Although high resolution readings may be obtained with such systems, the use of a flash lamp often limits the maximum reading rate obtainable in addition to limiting the life of the unit in accordance with the life of the flash lamp utilized. Another disadvantage of such a system is the low power output obtainable from the photodiodes.

It is therefore one object of the present invention to provide a shaft position indicator with extremely high resolution.

It is another object to provide a magnetically encoded shaft position indicator which can be coded directly into the sine of the angle of revolution, and still retain extremely high resolution.

It is another object to provide a method of encoding information on a magnetic member, which method allows any desired binary bit pattern to be written into the magnetic member.

It is still another object of the present invention to provide a method of recording information on a magnetic member which method lends itself to the nonlinear encoding of the position of the magnetic member.

Briefly, in accordance with the above objects, there is provided a magnetically encoded member such as a disk, drum, plate or the like adapted for movement relative to magnetic readout means and which magnetic member has a magnetic surface containing a plurality of information tracks extending in the direction of the relative movement. The information tracks are comprised of a plurality of discrete areas, with each area capable of being adjacent to and touching next succeeding discrete areas. Each of these discrete areas comprises either a magnetic north pole or a magnetic south pole which may represent a binary ONE or binary ZERO respectively. By making like magnetic poles successively touching each other, or alternatively, by spacing them a predetermined distance apart, a predetermined length of the track may be formed of, for example, all north pole areas thereby representing a binary ONE for that predetermined length. Next succeeding discrete areas may be formed of south poles thereby making a predetermined length along the track a binary ZERO, such that any desired magnetic pattern may be written into the track, or tracks. The discrete areas of north or south poles appearing at the magnetic surface may be written in by the method described herein which includes the steps of placing the magnetic member within the air gap of a writing head and pulsing the writing head with a direct current to cause a short bar magnetic quantum to be written into the magnetic surface in a direction substantially perpendicular to the relative movement of the magnetic surface. These short bar magnetic quanta each have a north pole and a south pole, and the perpendicular writing method causes one of these poles to appear at the exposed surface and the opposite pole to appear at the opposite surface. This technique allows a particular track to have a plurality of short bar magnetic quantum, with each quantum of the plurality having the same pole at the exposed surface for any desired length along the track. In addition, this technique allows short bar magnetic quantum to be written into the magnetic surface with each short bar magnetic quantum having a pole appearing at the magnetic surface which is opposite from the next preceding short bar magnetic quantum thereby signifying a change in binary state and providing for extremely high resolution. The above stated, and further objects of the present invention will become apparent upon a reading of the following detailed specification taken in conjunction with the drawings in which:

Figure 1:
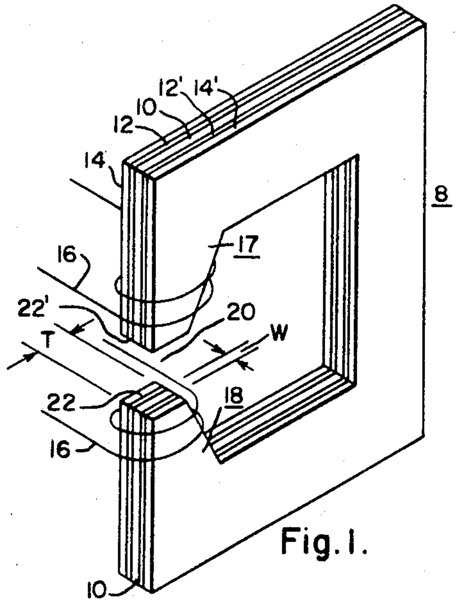
FIGURE 1 illustrates a writing head which may be utilized in the present invention.

Referring now to FIG. 1, there is shown a writing head which may be utilized to encode information according to the teachings of the present invention. The writing head is substantially C-shaped and comprises a plurality of laminations. The central laminations 10 affords a path for magnetic flux and may be composed of a thin strip of magnetic material such as commercially available Supermendur. Insulating laminations 12 and 12′, which may be Mylar, are adjacent the Supermendur strip 10 to insulate it from supporting laminations 14 and 14′ which may be made of brass. In order to create the necessary flux for writing, there is provided windings 16 associated with the pole pieces 17 and 18 of the writing head 8. The configuration of the writing head 8 is such that there is provided an air gap 20 for receiving the magnetic member to be encoded and which lies in close proximity to the pole faces 22 and 22'. The exposed portion of the magnetic strip 10 at the pole faces 22 and 22' substantially define the area of magnetic quantum to be written and to this end reference is now made to FIG. 2.

Figure 2:
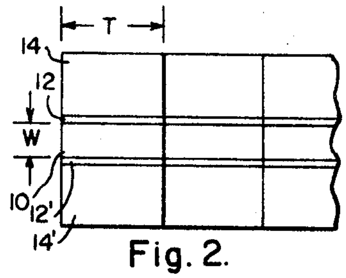
FIG. 2 illustrates a more detailed view of one pole face of the writing head of FIG. 1.

FIG. 2 shows in more detail the pole face 22 of the writing head 8. The exposed portion of the Supermendur strip 10 at the pole face 22 of the writing head 8, has a certain area defined by the dimension T and the dimension W. As will hereinafter be described, the dimension T substantially defines the width of the track to be written, and the dimension W defines the linear length of a pole of a short bar magnetic quantum which is written into the disk to be encoded. By way of example the width T may be in the order of 40 mils and the dimension W may be in the order of a mil. The encoding of a disk, or the like, according to the teachings of the present invention, may best be understood by referring to FIG. 3.

Figure 3:
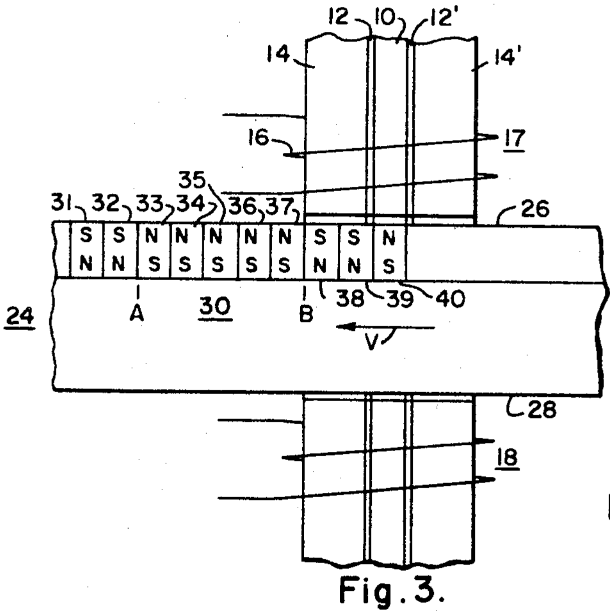
FIG. 3 illustrates the writing of magnetic quanta into a magnetic surface.

In FIG. 3 there is shown a magnetic member 24 positioned in the air gap 20 and between the pole pieces 17 and 18 of writing head 8. The magnetic member 24 comprises a suitable backing material or base 28 which may be a magnetically soft material such as mild steel. Bonded to the backing material 28 is a magnetic coating 26 which may take the form of barium ferrite for example. The magnetic member 24 comprising the backing material 28 and the magnetic coating 26 is positioned within the air gap for relative movement with the pole pieces 17 and 18 of the writing head 8, and such relative movement is shown by the direction of the arrow V, that is, the magnetic member 24 is moved relative to a stationary writing head, although it is to be understood that a suitable writing head may be moved relative to a stationary magnetic member. The positioning of the magnetic member 24 within the air gap 20 of the writing head 8 permits magnetic flux to pass from the upper pole piece to the lower pole piece or vice versa in a direction substantially perpendicular to the direction of the relative movement of the magnetic member 24 such that a short bar magnetic quantum is written into the magnetic coating 26 when a suitable direct current is applied to the windings 16 of the writing head 8. The mild steel base 28 permits magnetizing the short bar magnetic quanta perpendicular to the plane of the film 26 without wide leakage fields, in addition to offering a low reluctance flux path between adjacent oppositely poled magnetic quantum when the magnetic field is removed, resulting in more sharply defined poles on the exposed surface of the magnetic coating 26. A plurality 30 of short bar magnetic quantum is shown as being written into the magnetic coating 26 in a direction substantially perpendicular to the direction of the relative movement V of the magnetic member and writing head 8. The first quantum 31 is shown as having one pole, a south pole appearing at the surface of the magnetic coating 26 and an opposite pole, the north pole, appearing at the coating-backing interface. A second magnetic quantum 32 is shown with a south pole appearing at the exposed surface of the magnetic coating 26 and a north pole appearing at the opposite surface thereof. The second magnetic quantum is parallel to, and touching the first magnetic quantum 31. A third short bar magnetic quantum 33 is shown written into the magnetic coating 26 with a north pole appearing at the exposed surface and a south pole appearing at the opposite surface. In a similar manner the magnetic quantum 33 is parallel to and touching a next preceding magnetic quantum 32. Succeeding quanta 34 to 40 are written into the magnetic coating 26 such that succeeding short bar magnetic quantum lie adjacent to and touching next preceding short bar magnetic quantum. To continue with the writing process, the magnetic member 24 is successively indexed relative to the writing head 8 by an increment of distance equal to the linear length W of the short bar magnetic quantum. In this manner a continuous magnetic pole pattern appears at the surface of the magnetic coating 26 which extends in the direction of the relative movement and to this end reference is now made to FIG. 4.

Figure 4:
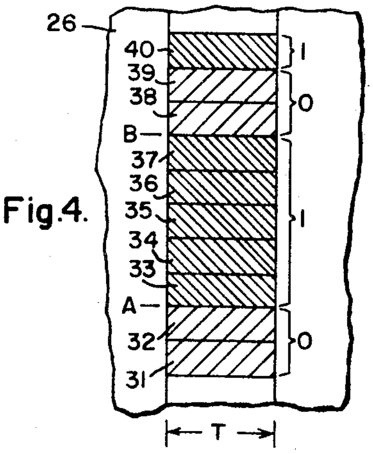
FIG. 4 illustrates a magnetically encoded pattern.
Figure 5:
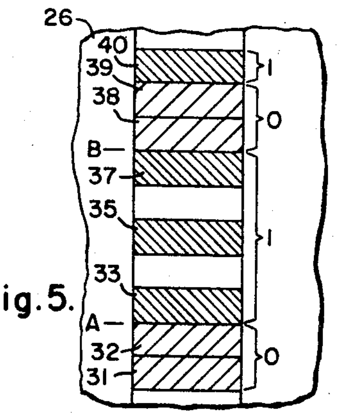
FIG. 5 illustrates another embodiment of the present invention.

FIG. 4 shows a portion of the exposed surface of the magnetic coating 26 having a track thereon comprising the magnetic qaunta 31 to 40 written into the magnetic coating 26 as shown in FIG. 3. The width of the track is T and each magnetic quantum has a dimension in the direction of the track of W. The first two magnetic quanta 31 and 32 have south poles appearing at the exposed surface of the coating 26 and these may be arbitrarily defined as a binary ZERO. The next five magnetic quanta 33 to 37 shown shaded, have a north pole at the exposed surface of the coating 26 and may represent a binary ONE. The next two magnetic quanta 38 and 39 have south poles appearing at the surface of the magnetic coating 26, and the quantum 40 has a north pole appearing at the surface. This method of encoding is continued until a desired magnetic pattern is obtained in the track. Alternatively, a predetermined length of all north poles (or south poles) may be defined by an initial short bar magnetic quantum, a terminal quantum and one or more intermediate quantum, not necessarily touching one another. As an example, suppose that a predetermined length, from point A to point B is to be a binary ONE, that is, all north poles appearing at the surface. An initial short bar magnetic quantum 33 is written where the transition from a south pole is to occur (point A). Quantum 33 touches quantum 32. An intermediate quantum 35 may next be written and a terminal quantum 37 is written where the transition back to a south pole occurs (point B), the resulting pattern appearing in FIG. 5. In this manner a suitable magnetic readout means will sense a binary ONE between points A and B. Such a suitable readout means is more fully described and claimed in a copending application Ser. No. 286,348, filed June 7, 1963 by John Hurt, Jr. and assigned to the assignee of the present invention. FIG. 4 shows a portion of a track written into a shaft encoded disk; in general, a shaft encoded disk will have a plurality of such tracks and to this end reference is now made to FIG. 6.

Figure 6:
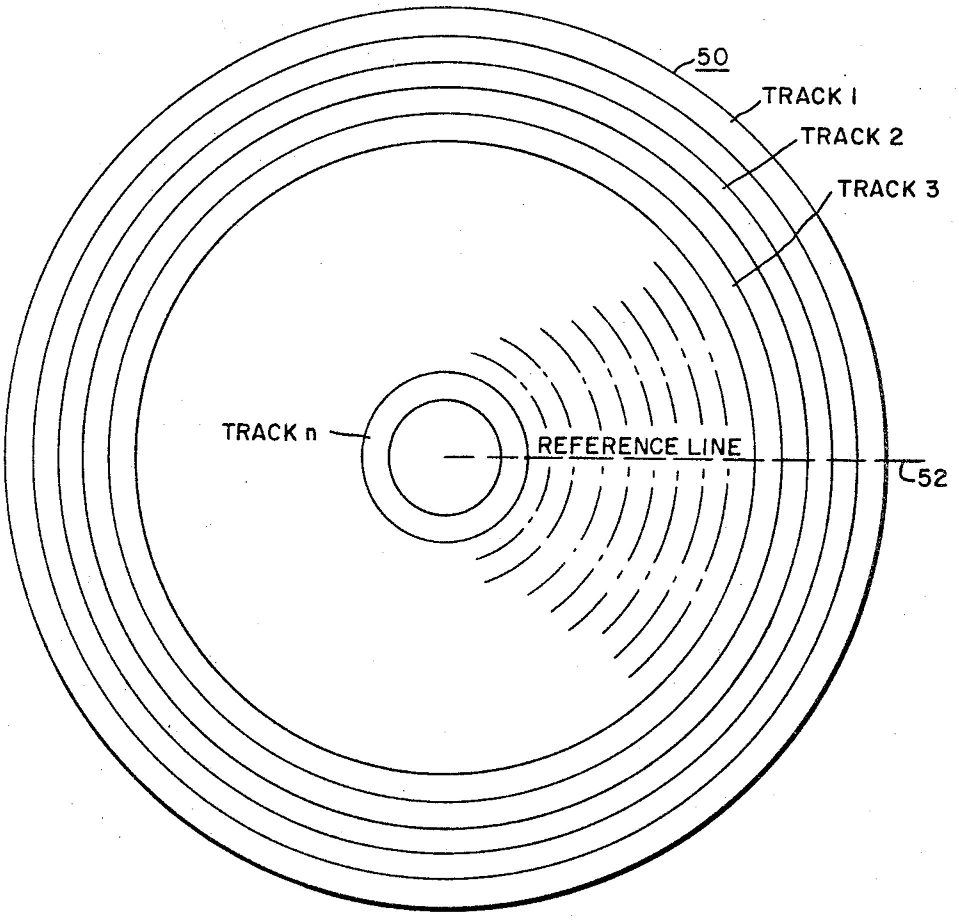
FIG. 6 illustrates a typical multi-track shaft position indicator.

In FIG. 6 there is shown a disk 50 having a first track labeled track 1 which may correspond to a least significant digit of a number, which number is indicative of the amount of rotation of the disk 50. A second track, track 2, is provided and is indicative of a next least significant digit. A number of tracks are generally provided and the innermost track, track *n*, is representative of the most significant digit. In order to read the magnetically encoded disk, there is provided reading means which is located along the reference line 52 and comprises a plurality of reading heads, one for each track provided on the disk 50. As the disk rotates, different magnetic patterns are presented to the plurality of reading heads which then provide a signal indicative of the amount of rotation of the disk 50 and by way of example reference should now be made to FIG. 7.

Figure 7:
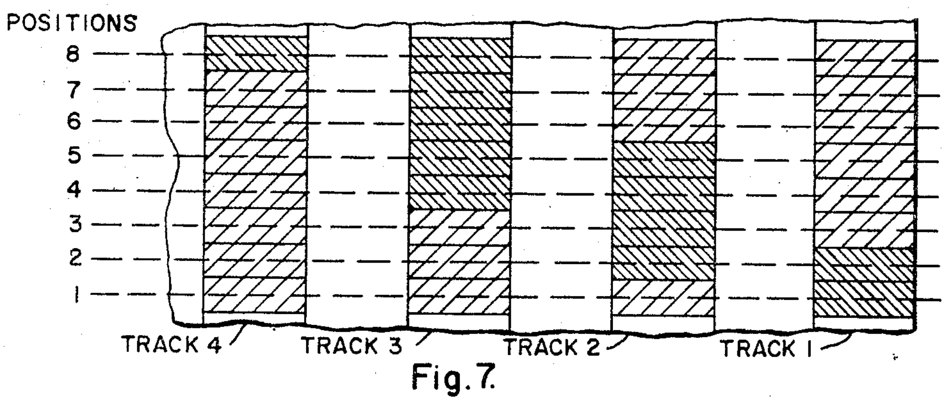
FIG. 7 is a more detailed view of a plurality of encoded tracks shown in FIG. 5.

In FIG. 7 there is shown a portion of four tracks of a disk although in actuality a typical disk may be comprised of 15 such tracks. Each small rectangular area comprising the tracks represent a pole of a short bar magnetic quantum written into the disk as heretofore described. It is common practice to employ a reflected binary, or gray code, which reduces errors due to a slight misalignment of a reading head since in going from one number to a next number only one bit changes its polarity. With the reading heads along a reference line located at position 1 an output will be obtained from the reading head above track 4 which will be a binary 0, the reading head above track 3 will provide a binary 0, the reading head above track 2 will provide another binary 0 and the reading head above track 1 will provide a binary 1 the output signal therefore being 0001 which is indicative of the number 1 in the gray code. With the reference line at position 2 the reading heads will provide an output signal 0011 indicative of the number 2 in gray code; with the reference line at position 3 the reading heads will provide an output signal 0010 indicative of the number 3 in gray code; with the reference line at position 4 the reading heads will provide an output signal 0110 indicative of the number 4 in gray code; at position 5 an output signal 0111 will be produced indicative of the number 5 in gray code; at position 6 an output signal 0101 will be produced indicative of the number 6 in gray code; at position 7 an output signal 0100 indicative of the number 7 in gray code will be produced and at position 8 an output signal 1100 will be produced indicative of the number 8 in gray code. Although the reference line in FIG. 7 is shown to occupy eight different positions, in a typical shaft encoded disk, the disk will move relative to a stationary reference line. Since the method of encoding the magnetic member as taught by the present invention allows an extremely small area to be presented at the surface of the member, an extremely high resolution disk may be provided and the eight levels of quantization shown in FIG. 7 may for example represent a fraction of a degree. In many computer applications it is necessary to convert the position of the disk into a corresponding angle and then into a corresponding function of the angle such as sine or cosine. The teachings of the present invention are equally applicable to the encoding of a disk directly into the sine or cosine function thus eliminating the need for extra conversion equipment while still retaining extremely high resolution.

While the teachings of the present invention have been described with respect to a shaft encoded disk, it is to be understood that the principles are equally applicable to the magnetic coding of other types of magnetic members such as cards, information bearing drums or the like.

Although the present invention has been described with a certain degree of particularity, it should be understood that the present disclosure has been made by way of example and that modifications and variations of the present invention are made possible in the light of the above teachings.

I claim as my invention:

1. A method of recording information on a magnetic member having a magnetic coating on a magnetically soft backing material including the steps of:
  (a) positioning said magnetic member within an air gap of a writing head for relative movement with the pole faces of said writing head;
  (b) energizing said writing head with a suitable source of electric energy such that a first short bar magnetic quantum is written into said magnetic coating in a direction substantially perpendicular to said relative movement, one pole of said short bar magnetic quantum appearing at the exposed surface of said magnetic coating and an opposite pole of said short bar magnetic quantum appearing at the opposite surface of said magnetic coating;
  (c) successively indexing said magnetic member relative to said writing head for writing a plurality of short bar magnetic quanta into said magnetic coating in a direction parallel to said first short bar magnetic quantum for creating a desired pattern on the exposed surface of said magnetic coating, said pattern determined by the poles of the plurality of short bar magnetic quanta appearing at said exposed surface, a sufficient successive number of similarly oriented poles forming an information block.

2. A method of encoding information on a magnetic member having a magnetic coating including the steps of:
  (a) positioning said magnetic member between the pole faces of a writing head for relative movement therewith;
  (b) energizing said writing head for writing a first short bar magnetic quantum into said magnetic coating in a direction substantially perpendicular to the direction of said relative movement such that only one of two possible poles of said short bar magnetic quantum appears at the surface of said magnetic coating;
  (c) successively indexing said magnetic member relative to said writing head for writing a plurality of short bar magnetic quanta into said magnetic coating in a direction substantially parallel to said first short bar magnetic quantum such that succeeding short bar magnetic quanta lie adjacent to and touch next preceding short bar magnetic quanta whereby a continuous magnetic pole pattern appears at the surface of said magnetic coating, said pattern extending in the direction of said relative movement, a sufficient successive number of similarly oriented poles forming an information block.

3. A method of encoding information on a magnetic member having a magnetic coating including the steps of:
  (a) positioning said magnetic member between the pole faces of a writing head for relative movement therewith;
  (b) energizing said writing head for writing a first short bar magnetic quantum into said magnetic coating in a direction substantially perpendicular to the direction of said relative movement such that only one of two possible poles of said short bar magnetic quantum appears at the surface of said magnetic coating;
  (c) successively indexing said magnetic member relative to said writing head for writing a plurality of short bar magnetic quanta into said magnetic coating in a direction substantially parallel to said first short bar magnetic quantum such that only short bar magnetic quanta, having an opposite orientation from a next preceding or next succeeding short bar magnetic quantum lie adjacent to and touch next preceding or succeeding short bar magnetic quantum whereby a continuous magnetic pole pattern appears at the surface of said magnetic coating, said pattern extending in the direction of said relative movement, a sufficient successive number of similarly oriented poles forming an information block.

4. A method of encoding information on a magnetic member having a magnetic coating deposited on a metallic backing including the steps of:
  (a) positioning said magnetic member between the pole faces of a writing head for relative movement therewith;
  (b) energizing said writing head for writing a first short bar magnetic quantum into said magnetic coating in a direction substantially perpendicular to the direction of said relative movement such that a first of two possible poles of said short bar magnetic quantum appears at the surface of said magnetic coating, said pole having a predetermined dimension extending in the direction of said relative movement;
  (c) indexing said writing head relative to said first short bar magnetic quantum by a distance greater than said predetermined dimension for writing at least a second short bar magnetic quantum, a sufficient successive number of similarly oriented poles forming an information block.

5. A method of encoding information on a magnetic member having a magnetic coating including the steps of:
  (a) positioning said magnetic member between the pole faces of a writing head for relative movement therewith;
  (b) energizing said writing head for writing a first short bar magnetic quantum into said magnetic coating in a direction substantially perpendicular to the direction of said relative movement such that a first of two possible poles of said short bar magnetic quantum appears at the surface of said magnetic coating, said pole having a predetermined dimension extending in the direction of said relative movement;
  (c) indexing said writing head relative to said first short bar magnetic quantum by a distance greater than said predetermined dimension for writing at least a second short bar magnetic quantum having the same orientation as said first short bar magnetic quantum and lying in the direction of said relative movement with the distance between said quanta representing said first pole, a sufficient successive number of similarly oriented poles forming an information block.

6. A magnetically encoded member comprising (a) a magnetically soft backing member offering a low reluctance flux path;

(b) a magnetizable medium on the surface of said backing member;

(c) at least one information track in said medium;

(d) said information track comprising a plurality of magnetic poles of short bar magnetic quanta which extend into said medium in a substantially perpendicular direction to said surface, such that each said pole touches a next preceding pole;

(e) each said magnetic pole having either a first or second value polarity whereby a desired magnetic pattern is formed in said track, a sufficient successive number of similarly oriented poles forming an information block.

References Cited

UNITED STATES PATENTS

| | | | |
|---|---|---|---|
| 2,585,932 | 2/1952 | Hare | 177—100.2 |
| 2,767,243 | 10/1956 | Steeneck | 340—174.1 |
| 3,103,665 | 9/1963 | Martin et al. | 346—174 |
| 3,034,111 | 5/1962 | Hoagland et al. | 340—174.1 |
| 2,381,463 | 8/1945 | Porter | 179—100.2 |
| 2,501,126 | 3/1950 | Howell | 179—100.2 |
| 2,830,207 | 4/1958 | Clark | 340—347 |
| 3,197,763 | 8/1965 | Fisher | 340—347 |
| 3,200,207 | 8/1965 | Rainer | 179—100.2 |
| 3,251,054 | 5/1966 | Simon | 340—174 |

BERNARD KONICK, *Primary Examiner.*

BARRY L. HALEY, *Assistant Examiner.*

U.S. Cl. X.R.

340—174.1